Aug. 28, 1923.
A. J. GERRARD ET AL
MACHINE FOR CUTTING AND SWAGING BALE TIES
Filed June 14, 1922          2 Sheets-Sheet 1
1,466,334
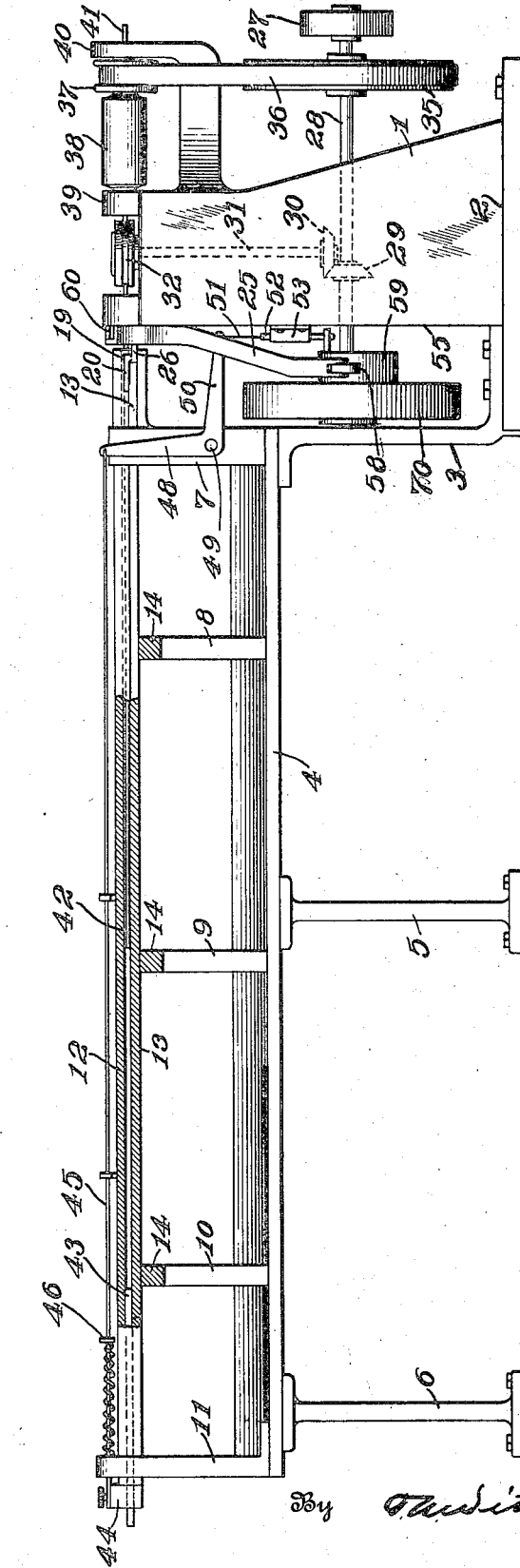
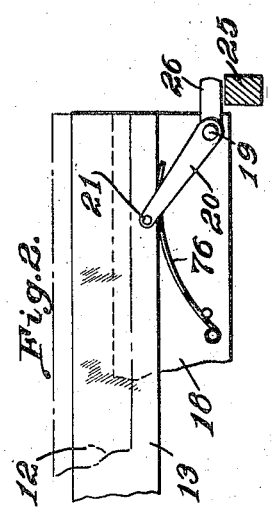
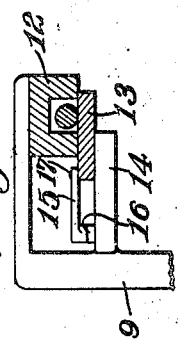

Aug. 28, 1923.
A. J. GERRARD ET AL
1,466,334
MACHINE FOR CUTTING AND SWAGING BALE TIES
Filed June 14, 1922    2 Sheets-Sheet 2
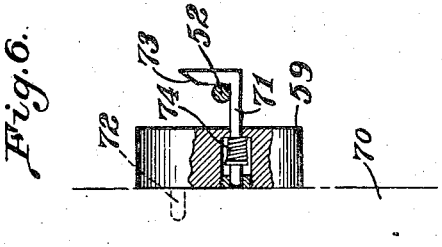
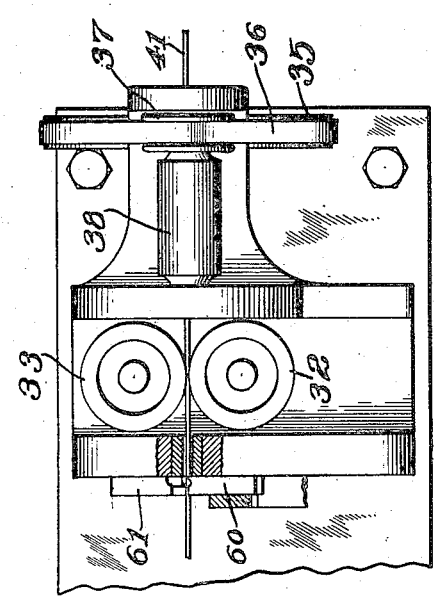
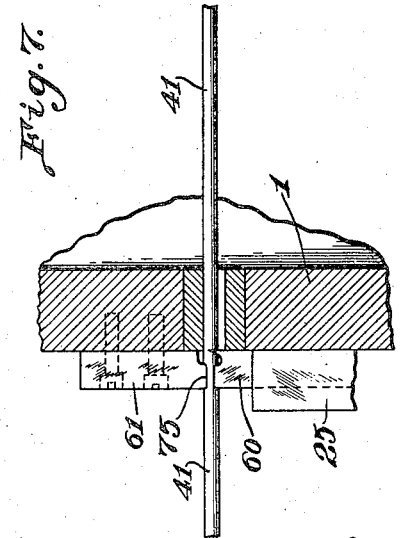
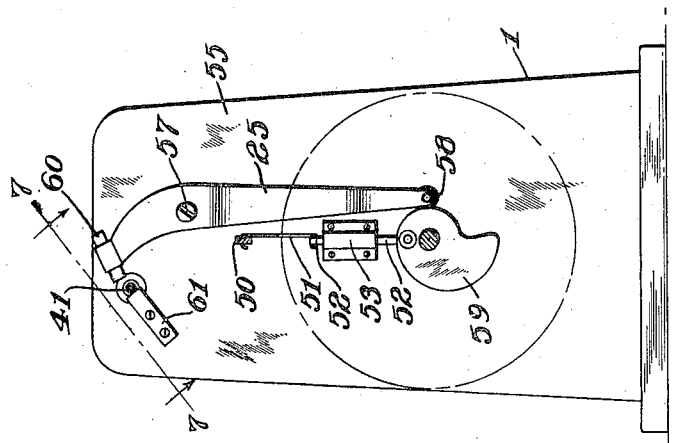
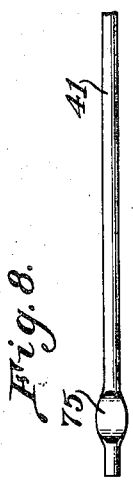
Inventors
A. J. Gerrard and
Parvin Wright by
T. R. Wilkinson
Attorney Patented Aug. 28, 1923.

1,466,334

UNITED STATES PATENT OFFICE.

ALEC J. GERRARD AND PARVIN WRIGHT, OF CHICAGO, ILLINOIS.

MACHINE FOR CUTTING AND SWAGING BALE TIES.

Application filed June 14, 1922. Serial No. 568,305.

*To all whom it may concern:*

Be it known that we, ALEC J. GERRARD and PARVIN WRIGHT, respectively a subject of the King of Great Britain and a citizen of the United States, both residing at Chicago, in the county of Cook and State of Illinois, have invented certain new and useful Improvements in Machines for Cutting and Swaging Bale Ties; and we do hereby declare the following to be a full, clear, and exact description of the invention, such as will enable others skilled in the art to which it appertains to make and use the same.

This invention relates to a machine for straightening, swaging and cutting wires into predetermined lengths, and has for its object to improve the construction of somewhat similar machines that have been heretofore proposed.

With these and other objects in view, the invention consists in the novel details of construction, and combinations of parts more fully hereinafter disclosed and particularly pointed out in the claims.

Referring to the accompanying drawings forming a part of this specification, in which like numerals designate like parts in all the views:

Figure 1 is a diagrammatic side elevational view, partly in section, of a machine made in accordance with this invention;

Figure 2 is a fragmentary detail view, in plan, showing how the wire receiving channel may be opened;

Figure 3 is a cross sectional view of the wire receiving channel and its supporting parts;

Figure 4 is a face view of the pedestal portion of the machine, indicating the cutting and swaging dies and their co-acting parts;

Figure 5 is a plan view of the wire straightening and feeding portion of the machine;

Figure 6 is a partially sectional detail view illustrating the clutch mechanism between the actuating cam and the fly wheel of the machine;

Figure 7 is a detail view illustrating the action of the cutting and swaging dies; and Figure 8 is a view of the end portion of the wire after it has been cut and swaged.

1 indicates a pedestal having a base 2 on which is mounted a bracket 3, and 4 indicates a supporting base mounted on the frames 5 and 6. Carried by the base 4 are a plurality of frame members 7, 8, 9, 10 and 11 supporting the wire guide or runway 12 of an inverted U-shape having the slidably removable bottom member 13 supported by the arms 14 with which the members 7, 8, 9, 10 and 11 are provided. Said arms 14 carry the members 15 pivoted as at 16 to said arms and as at 17 to said removable bottom. At the extreme right hand end of said bottom member 13, as seen in Figure 1, there is provided a shelf 18 on which is pivoted as at 19 the angle lever 20 having one end pivoted as at 21 to said bottom 13, while a spring 22 presses against said bottom as shown. From the foregoing, it will be apparent that when the lever 25 strikes the toe 26 of said lever 20, its end 21 will swing in a counter-clockwise direction, as seen in Figure 2, and carry with it said bottom 13. The latter will thus move endwise and away from the runway 12, being guided in its movements by the members 15.

27 represents a power pulley rigid with the shaft 28 carrying the bevel gear 29 meshing with the gear 30, rigid with the shaft 31 carrying the feed roll 32 and turning by suitable connections not shown the companion feed roll 33. Said shaft 28 also carries the pulley 35 over which passes the belt 36, and the latter imparts rotation to the pulley 37 rigid with the wire straightener 38, of well known form, mounted in the bearings 39 and 40. The wire 41 to be straightened, deformed, and severed, is fed, from a coil not shown, through the pulley 37, straightener 38 and between the feed rolls 32 and 33, which exert a pull on said wire and serve to push the same through the channel or runway 12 until its extreme end 42 strikes the plunger rod 43 and pushes the same toward the left as seen in Figure 1. When this happens, a predetermined length of straight wire has entered said channel 12 and its end is ready to be deformed and severed in the manner now to be disclosed.

Said plunger 43 has attached to its outer end the lug 44 to which one end of a wire 45 is secured, which carries a stop 46, and between this stop and the frame member 11 is located a spring which is compressed when the wire 45 is pulled on by the stop 46. The pulling of the wire 45 by said stop turns the bell crank 48 on its pivot 49, which lifts the arm 50 and the rod 51 connected thereto. Said rod is joined to the slidable bar 52 mounted in the housing 53, and its lower end normally lies in the path of a clutch member 71.

That is to say, the fly wheel 70 is rigid with the power shaft 28 and continuously turns therewith while the cam 59 is loose on said shaft and only turns when coupled to said fly wheel by the spring controlled clutch member 71 entering a notch 72 in said fly wheel as best illustrated in Figure 6. When said cam 59 and clutch member 71 are turning with said fly wheel 70, the path of said clutch 71 being crossed by said bar 52, the beveled outer end 73 of said clutch will strike the bar 52 and the cam will be disengaged from the fly wheel after one rotation has taken place. On the other hand, when the bar 52 is raised out of the path of the clutch 71 in the manner disclosed, the spring 74 will cause said clutch to engage the fly wheel and the cam will again be given a single revolution.

Pivoted at 57 to the face 55 of the pedestal 1 is the lever 25 above mentioned, whose lower end carries a roller 58 which is moved by the cam 59, and thus is the upper end of the lever carrying the cutting and swaging die 60 thrown to the left, as seen in Figure 4. The wire 41 is fed by the rollers 32 and 33 across the path of movement of said die 60, and over the face of the anvil 61 rigid with said pedestal 1, all as will be clear from Figures 1, 4 and 7.

The parts are so timed and adjusted that when the end 42 of the wire 41 strikes the plunger 43 as above described, the wire 45 will be pulled on, the bell crank arm 50 will be lifted, which will lift the rod 52 out of the path of the clutch member 71, and said cam 59 will be joined to and rotate with said fly wheel 70 and shaft 28. The rotation of the cam 59 actuates the lever 25 and swaging die 60 to cut the wire 41, and to deform its end by placing a notch or other depression 75 therein as best seen in Figure 8. At the same time, the swaging and cutting action takes place, the lever 25 strikes the toe 26, (see Figure 2) and opens the bottom of the channel 12 to permit the severed wire to fall out. The springs 76 return said bottom for the next wire.

The purpose of this machine is to first straighten wire material which is sold in large coils, and to swage their ends as illustrated in Figure 8, and then cut them into predetermined lengths in order that they may be used in the now well known wire tying machines which employ such swaged wires in the banding of boxes and other packages.

The operation of the machine will be clear from the foregoing, but may be briefly summarized as follows: The wire 41 is brought to the straightener 38 from the coil of wire not shown, it is passed between feed rollers 32 and 33 over the anvil 61 and swaging die member carried thereby, whence it is passed into the receiving channel 12, where its extreme end 42 strikes the plunger 43 which actuates the wire 45, bell crank 48, and pulls up on the rod 52 lying in the path of the clutch 71. Withdrawal of the said rod 52 from the clutch 71 causes said clutch 71 to connect the actuating cam 59 with the continuously rotating fly wheel 70, and to actuate the lower end of the lever 25, which is pivoted to the face 55 of the pedestal 1, at the point 57, see Figure 4. The upper extreme end of the lever 25 carries another member 60 of the cutting and swaging dies, which move in the arm of a circle and intersect the path of the straightened and fed wire 41.

It thus results that when the cam 59 actuates the lever 25, the die member carried thereby forces the said wire 41 against the companion die members carried by the anvil 61, and places the notch 75, see Figure 8, in the wire, while at the same time cuts off the desired predetermined length of the wire, all as will be clear from Figure 7.

After a predetermined length of the wire 41 has been thus cut off, it is dropped from the channel 12 by reason of the bottom 13 being withdrawn from said channel, all in the manner above described.

It is an important feature of this invention that the anvil 61 is placed in the arc of the circle traversed by the die member 60 and at a distance of about 45° from a verticle plane passing through the pivot 57, for by so placing this said anvil, the severed wire 41 readily rolls off or falls off the surface of the anvil and drops from the channel 12. Were the said anvil placed in a vertical position, or say 90° from the said vertical plane above mentioned, the wires would be caught on the surface of said anvil, and would thus clog the machine. On the other hand, if the anvil were placed in a horizontal position, or with its swaging surface in said vertical plane, the swaging action of the die 60 could not act upon the wires as efficiently as is the case when the anvil is placed as illustrated in Figure 4. It is a further important feature of the invention that the cutting member of the die 60 moves in contact with the face of the pedestal 1, for such location readily permits the wire to be efficiently sheared or cut in two parts, and it is an additional feature of the invention that the swaging member of the die 60 is removed from the face of the pedestal 1, and the cutting member as shown in Figure 7, for such location of said swaging member permits the depressed or deformed portion 75 of the wire to be located a short distance from the end of said wire, thus causing said end to constitute a holding portion or head, as will be readily understood. Further, this location of the swaging member of the die and the forming of said swaging member integral with the cutting member causes the swaging member to strike flat against the anvil 61 simultaneously with the severing action of the cutting member.

What we claim is:

1. In a wire straightening and swaging machine, the combination of means to straighten a wire; means to receive predetermined lengths of said wire; a power shaft; a cam loose on said shaft; means to connect said cam with said shaft when a predetermined length of wire has entered said receiving means; a lever actuated by said cam; one member of a pair of swaging dies carried by said lever; a stationary anvil carrying another member of said pair of dies cooperating with said first named die member; and a cutting die member rigid with and spaced from one of said swaging die members, substantially as described.

2. In a wire straightening and swaging machine, the combination of means for feeding and straightening a predetermined length of wire; a continuously rotating power shaft; a pedestal having a face through which said wire is fed; a lever pivoted between its ends to said face; an anvil provided with one member of a pair of swaging dies rigid with said face, disposed in the path of movement of one of the ends of said lever, and adjacent the path of travel of said wire; another member of said pair of swaging dies carried by said lever end; and a cutting die member moving over the said pedestal face and rigid with one of said swaging die members, substantially as described.

3. In a wire straightening and swaging machine, the combination of a pedestal having a vertically disposed face through which a wire may be fed; a wire straightening means carried by said pedestal; a wire feeding means carried by said pedestal; a power shaft and connections carried by said pedestal for operating said wire straightening and wire feeding means; means associated with said pedestal for receiving predetermined lengths of wire after it has been straightened; a lever pivoted on said face of said pedestal having a free end moving in the arc of a circle and carrying cutting and swaging die members spaced from each other; and an anvil located in the path of travel of said swaging die member adjacent the feed wire and carrying a complemental swaging die member adapted to coact with said first named swaging die member, substantially as described.

4. In a wire straightening and swaging machine, the combination of a pedestal having a vertically disposed face through which a wire may be fed; a wire straightening means carried by said pedestal; a wire feeding means carried by said pedestal; a power shaft and connections carried by said pedestal for operating said wire straightening and wire feeding means; means associated with said pedestal for receiving predetermined lengths of wire after it has been straightened; a lever pivoted on said face of said pedestal having a free end moving in the arc of a circle and carrying cutting and swaging die members; an anvil located on said pedestal face provided with a complemental swaging die member, the face of which is located in a plane substantially forty-five degrees from the vertical and adjacent the fed wire; and a clutch disposed between said power shaft and said lever adapted to be actuated by said fed wire, substantially as described.

5. In a wire straightening and swaging machine, the combination of means to straighten the wire; means to receive predetermined lengths of said wire; a power shaft; actuating means loose on said shaft; means to connect said actuating means with said shaft when a predetermined length of wire has entered said receiving means; means controlled by said actuating means; one member of a pair of swaging dies carried by said last named means; a stationary anvil carrying another member of said pair of dies cooperating with said first named die member; and a cutting die member rigid with and spaced from one of said swaging die members.

6. In a wire straightening and swaging machine the combination of means to straighten the wire; means to receive predetermined lengths of said wire; a power shaft; actuating means loose on said shaft; means to connect said actuating means with said shaft when a predetermined length of wire has entered said receiving means; die operating means controlled by said actuating means; a swaging die operated by said last named means; a stationary anvil cooperating with said die operating means; and a cutting member rigid with and spaced from said swaging die and actuated by said die operating means, substantially as described.

In testimony whereof we affix our signatures.

ALEC J. GERRARD.
PARVIN WRIGHT.